July 8, 1958    H. ELLERN ET AL    2,842,477
SULFUR DIOXIDE GAS GENERATING COMPOSITION
Filed April 14, 1955
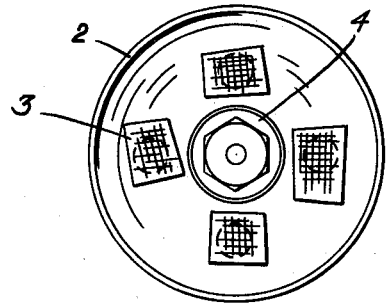
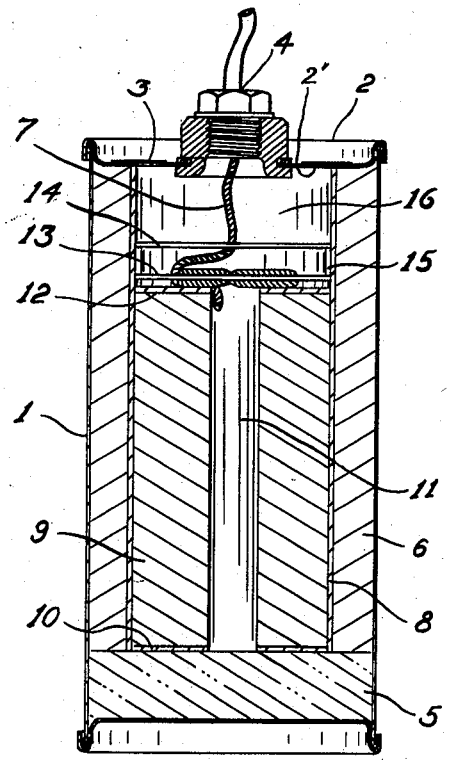
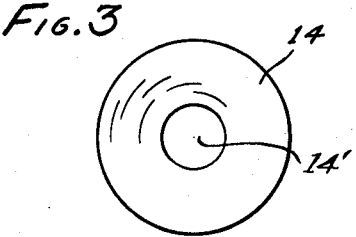
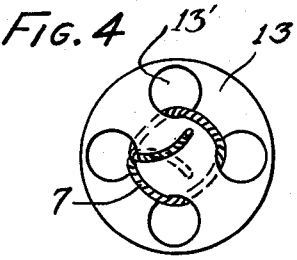
HERBERT ELLERN  INVENTOR
ISADORE KOWARSKY
DONALD E. OLANDER
BY *Alvin Browdy*
ATTORNEY

United States Patent Office 2,842,477
Patented July 8, 1958

2,842,477
SULFUR DIOXIDE GAS GENERATING COMPOSITION

Herbert Ellern, Ferguson, Isadore Kowarsky, University City, and Donald E. Olander, Florissant, Mo., assignors to Universal Match Corporation, Ferguson, Mo., a corporation of Delaware Application April 14, 1955, Serial No. 501,420

13 Claims. (Cl. 167—40)

The present invention relates to a pyrotechnic device, and more particularly to a chemical generator and compositions for use therein to produce sulfur dioxide gas.

It has heretofore been proposed in pyrotechnic devices to utilize a mixture of perchlorate and sulphur for various purposes, however, no one has invented a safe and reliable source for sulfur dioxide gas which delivers calculated amounts of gas under pressure at a predetermined speed without excessive heating up of the generator container.

An object of the present invention is to provide a new and improved sulfur dioxide generator.

A further object of the present invention is to provide a new and improved composition suitable for generating sulfur dioxide gas under pressure.

A still further object of the present invention is to provide a sulfur dioxide generator that produces calculated amounts of sulfur dioxide gas under pressure at a predetermined speed without excessive heating up of the generator container.

Other objects and the nature and advantages of the instant invention will be apparent from the following description taken in conjunction with the accompanying drawings, wherein:

Fig. 1 is a longitudinal sectional view through a sulfur dioxide generator constructed in accordance with the preferred embodiment of the invention;

Fig. 2 is a top plan view of the generator;

Fig. 3 is a top plan view of the upper baffle; and

Fig. 4 is a top plan view of the lower baffle showing the fuse laced therethrough.

The generator described herein is a safe and reliable source for sulfur dioxide gas which may be mixed with the atmosphere, or used to permeate loose bulk material with the gas for disinfection, bleaching, or other purposes. While compressed or liquefied sulfur dioxide in small cartridges of comparable weight and capacity will initially deliver the gas under a required pressure, such pressurized cartridges will not maintain the required pressure during the total time of release as is required for permeation of bulk material. Further, such pressurized cartridges are inoperative at low ambient temperatures as are experienced in winter or arctic conditions since the vapor pressure of sulfur dioxide falls below atmospheric pressure at a temperature of −10° C. (+14° F.). In contradistinction, the present device and compositions will permit operation at all ambient temperatures and at essentially constant or moderately increasing rather than decreasing pressures. Further, the combination of chemical components utilized in the composition as well as their physical arrangements, permit operation of the device without excessive heat from the gas as well as from the container, thus insuring safety of operation of the device.

Referring to the drawings, the gas generator consists of an elongated cylindrical metal body 1, to which is crimped a perforated closure disc 2 having a plurality of openings 2' therethrough. Each of the openings 2' is sealed by a patch of adhesive-coated tape 3. An ignition source 4 in the form of an electrically ignited squib is secured in a center opening of the closure disc 2. The squib 4 may be any well known standard military item for which no novelty is claimed. Changes in shape of the container, mechanism of gas release and ignition source are contemplated and may be designed as desired to meet the conditions of use.

An insulating layer 5 is provided at the base of the container. Compressed fire-clay is well suited for this purpose. An insulating sleeve 6 is placed adjoining the walls of the container 1. The insulating sleeve 6 may be made of heavy cardboard, asbestos, compressed fire-clay or another material of low heat conductivity.

A thin-walled metal cylinder 8 is placed in the container resting on the insulating layer 5 and adjacent to the insulating sleeve 6. A thin layer of compressed fire-clay 10 is first pressed in the bottom of the cylinder 8, followed by the pyrotechnic composition 9. A cylindrical center hole 11 is maintained within the pyrotechnic pellet to provide for reduced web thickness of the linear burning composition. Any desired shape of pellet may be substituted to meet desired speed of burning conditions. An easily ignitable first fire composition 12 is pressed upon the pyrotechnic composition 9.

To provide for the retention of reacting material and for precooling of the developed gas, a lower baffle 13 is arranged adjacent to the first fire composition after lacing a fuse train 7 through a plurality of holes 13' in the baffle. The holes 13' are arranged peripherally on the lower baffle 13 as is shown in Fig. 4. The lower baffle 13 may be a metal disc. An upper baffle 14 with a single center hole 14' is arranged a short distance above baffle 13, spaced therefrom by means of a metal spacing ring 15. An air space 16 is provided above the baffle 14 for heat dissipation from the gase and to retain any erupting solid or liquid residue. The fuse train 7 is connected to the squib 4 at one end and passes through the hole 14' in baffle 14 and is then laced through the baffle 13 so that its lower end is in contact with the first fire composition 12, to conduct ignition from the squib 4 to the first fire composition 12. The fuse train 7 may be any suitable firecracker fuse or quick match.

Other shapes or arrangements are contemplated so long as reliable ignition is obtained, steady confinement and reproduceable burning of the major composition, heat insulation of the outer container, and retention of reacting solid or liquid matter is achieved. For example, when a heavy cardboard tube is utilized for the insulating sleeve 6, the metal cylinder 8 may be omitted and the composition may be pressed into the cardboard tube.

The pyrotechnic composition 9 consists basically of sulfur, an oxidizer, and a metal sulfate. It has been found that the reaction between sulfur and an oxidizer results in a good production of sulfur dioxide gas; however, the reaction is highly exothermic, and so much heat is given off that the container becomes overly heated. According to the present invention, the vigorous exothermic reaction between the sulfur and the oxidizer is superimposed upon an endothermic reaction between sulfur and a metal sulfate, both reactions giving off sulfur dioxide gas. A third reaction also occurs between the oxidizer and an intermediately produced metal sulfide, this reaction also supplying sulfur dioxide. The result is a vigorously proceeding and easily controllable combined reaction which is considerably cooler burning than the straight sulfur-oxidizer reaction.

The sulfur used in this composition may be the commercial "Flour of Sulfur" of low acidity.

The oxidizer is preferably a perchlorate, such as potassium perchlorate. Nitrates, such as sodium or potassium nitrate may be used where contamination of the sulfur dioxide with small amounts of nitrogen oxides is not undesirable. Chlorates can likewise be used, however the mixing and pressing of such compositions is more hazardous. Any suitable oxidizer which will react with dry sulfur to release its oxygen content to the sulfur may be used such as certain chromates, persulfates and the like.

The metal sulfate may be copper sulfate, ferrous sulfate, ferric sulfate, calcium sulfate, magnesium sulfate, or any suitable metal sulfate. The sulfate should be used in the anhydrous or partially dehydrated state, rather than as the commercial hydrated salts. When using calcium sulfate, for example, the anhydrous salt, semihydrate or the dihydrate may be used. Magnesium sulfate heptahydrate or preferably in partially dehydrated state is suitable. Such processed salts have the ability of absorbing water from humid air rather than giving off water under unfavorable ambient conditions so that the finished product has excellent surveillance properties. Thus, the pyrotechnic composition, first fire composition, fuse train and electric squib are not exposed to the action of moisture.

Any water of hydration present in the salt is volatilized during the reaction, and this endothermic reaction likewise contributes somewhat to the regulative cooling process of the reaction.

The following reactions represent an example of the chemical reactions which occur utilizing an embodiment of the invention:

(1) $KClO_4 + 2S \rightarrow 2SO_2 + KCl$

This is a very strongly exothermic reaction.

(2) $CuSO_4 + 2S \rightarrow 2SO_2 + CuS$

This is a fairly strongly endothermic reaction.

(3) $4\ CuS + 3KClO_4 \rightarrow 4CuO + 4SO_2 + 3KCl$

This is an exothermic reaction.

(4) $4\ CuSO_4 + 8S + 3KClO_4 \rightarrow 4CuO + 12SO_2 + 3KCl$

This reaction is moderately exothermic.

Thus, it will be seen that the first reaction supplies enough heat to cause the other reactions to occur at the proper rate. The percentages of the ingredients can thus be balanced to cause the Reaction Number 4 to proceed at the desired rate.

In addition to the regulation of the heat output, rate of evolution of gas and the burning speed by the balancing of the exothermic and endothermic reactions, all of the ingredients used in this balancing contribute directly to the formation of the sulfur dioxide. Thus, the present invention permits the best weight and volume economy without the introduction of conventional pyrotechnical coolants, such as carbonates, bicarbonates, siliceous materials and the like which must be used in large quantities to obtain the equivalent cooling, and these additions would result in a substantial reduction of the burning rate. Small amounts of such modifiers may, of course, be added under certain conditions.

The following specific examples of pyrotechnic compositions are preferred embodiments of the invention and are set forth for purposes of illustration rather than limitation:

*Example I*

| | Percent by weight |
|---|---|
| $KClO_4$, powdered | 32.9 |
| Sulfur, powdered | 19.7 |
| Anhydrous cupric sulfate | 45.4 |
| Talc | 2.0 |

The talc is added as an internal lubricant in the pressing of the pellets, however, other additives of similar character may be substituted, such as graphite, molybdenum sulfide, or other inorganic type internal lubricants.

The first fire composition may be a stoichiometric mixture of sulfur and potassium perchlorate of the following formula:

| | Percent by weight |
|---|---|
| Potassium perchlorate | 67.2 |
| Sulfur | 30.9 |
| Talc | 1.9 |

No novelty is claimed for the first fire composition as such, but as part of the device it constitutes an ignition mixture which is an active sulfur dioxide gas former at the same time.

The composition of Example I, excluding the talc, on the basis of mol ratios, shows that Reaction 1 is balanced against Reaction 4 at the ratio of 1:17 by weight of all active components. To express it differently, the components utilized are present in the mol ratio of 1:2.6:1.2 for $KClO_4$:$S$:$CuSO_4$ with the Reaction 2 using all of the cupric sulfate and 2.4 mols of the sulfur, leaving 0.2 mol of the sulfur for the strongly exothermic Reaction 1 with 0.1 mol $KClO_4$, and 0.9 mol $KClO_4$ to react with the intermediate compound CuS.

The formula of Example I gives a fast progression and relatively cool burning.

The following examples may utilize the same first fire composition as given above, and omit the internal lubricant, although it should be noted that a lubricant, such as talc, may be used in amounts up to 5% by weight.

*Example II*

The range of ingredients may be as follows:

| | |
|---|---|
| $KClO_4$ | 31–49% by weight. |
| Sulfur | 19–27% by weight. |
| $CuSO_4$ | 50–24% by weight (on anhydrous basis). |

*Example III*

The ingredients expressed in mol percent may be included in the following range:

| | Mol percent |
|---|---|
| $KClO_4$ | 19–27 |
| $SO_4$=(metal sulfate) | 28–11 |
| S | 53–63 |

The following examples are all expressed in percent by weight:

*Example IV*

| | Percent |
|---|---|
| $MgSO_4$ | 42–21 |
| S | 22–31 |
| $KClO_4$ | 35–52 |

*Example V*

| | |
|---|---|
| $CaSO_4$ | 45–22 |
| S | 21–31 |
| $KClO_4$ | 33–50 |

*Example VI*

| | |
|---|---|
| $FeSO_4$ | 48–24 |
| S | 20–30 |
| $KClO_4$ | 36–56 |

*Example VII*

| | |
|---|---|
| $Fe_2(SO_4)_3$ | 49–29 |
| S | 21–31 |
| $KClO_4$ | 36–55 |

*Example VIII*

| | |
|---|---|
| $CuSO_4$ | 40–20 |
| S | 31–38 |
| $KNO_3$ | 29–42 |

The percentages of the metal sulfate in each of the above examples are based on anhydrous values.

The use of the fully hydrated salts is generally to be avoided since the release of moisture resulting from the application of external heat may cause some of the ingredients of the composition to deteriorate. However, partially dehydrated salts will work very well and at the same time serve to cool the reaction by the absorption of heat during evaporation of the water.

In the claims, when the statement is made that the metal sulfate is a salt from which at least a portion of the water of hydration has been removed, it is meant to include the anhydrous salt where all of the water of hydration has been removed.

It will be obvious to those skilled in the art that various changes may be made without departing from the spirit of the invention and the invention is not limited to what is shown in the drawings and described in the specification, but only as indicated in the appended claims.

What is claimed is:

1. A non-explosive sulfur dioxide gas forming composition comprising sulfur, a solid combustion-supporting oxidizer for said sulfur, and a metal sulfate, said sulfur being adapted to react exothermically with said oxidizer and being adapted to react endothermically with said metal sulfate, the quantities of the sulfur, oxidizer, and metal sulfate in the exothermic and endothermic reactions being stoichiometrically proportioned so that a substantial portion of the heat generated by the exothermic reaction is absorbed by the endothermic reaction, and thereby regulating the total net heat output of the combined reactions.

2. A non-explosive composition in accordance with claim 1 wherein the oxidizer is potassium perchlorate.

3. A non-explosive composition in accordance with claim 1 wherein the metal sulfate is a salt from which at least a portion of the water of hydration has been removed.

4. A non-explosive composition in accordance with claim 1 wherein the oxidizer is potassium perchlorate and the metal sulfate is a salt from which at least a portion of the water of hydration has been removed.

5. A non-explosive composition in accordance with claim 1 wherein a minor amount of an internal lubricant is included in the composition.

6. A non-explosive sulfur dioxide gas forming composition comprising sulfur 19–27% by weight, potassium perchlorate 31–49% by weight, $CuSO_4$ 50–27% by weight calculated on an anhydrous basis, and up to 5% talc.

7. A non-explosive sulfur dioxide gas forming composition comprising sulfur 31–38% by weight, potassium nitrate 29–42% by weight, and $CuSO_4$ 40–20% by weight calculated on an anhydrous basis.

8. A non-explosive sulfur dioxide gas forming composition comprising sulfur 19.7% by weight, potassium perchlorate 32.9% by weight, $CuSO_4$ calculated on an anhydrous basis 45.4% by weight, and talc 2.0% by weight.

9. A non-explosive sulfur dioxide gas forming composition comprising sulfur 20–38% by weight, a solid combustion-supporting oxidizer for the sulfur 29–56% by weight, and a metal sulfate 49–20% by weight calculated on an anhydrous basis.

10. A non-explosive sulfur dioxide gas forming composition comprising 53–63 mol percent of sulfur, 19–27 mol percent of a solid combustion-supporting oxidizer for said sulfur, and 28–11 mol percent of sulfate present as a metal sulfate.

11. A non-explosive sulfur dioxide gas forming composition comprising 53–63 mol percent sulfur, 19–27 mol percent potassium perchlorate and 28–11 mol percent of sulfate present as a metal sulfate of lower water content than contained in the normally stable form of the salt under normal atmospheric conditions.

12. An ignitible disinfectant adapted, upon ignition, to burn at a non-explosive rate with the resultant production of a copious quantity of sulfur dioxide gas, said disinfectant comprising a metal sulfate, sulfur, and a solid combustion-supporting oxidizer of the class consisting of the chlorates, perchlorates, and nitrates of sodium and potassium, said sulfur being present in sufficient quantity so that a portion of the sulfur is stoichiometrically balanced with the oxidizer and will react therewith to produce sulfur dioxide and a predetermined quantity of heat, and the remainder of the sulfur is stoichiometrically balanced with the metal sulfate and will react therewith to produce sulfur dioxide and to absorb substantially all of the heat produced by the reaction between the sulfur and the oxidizer.

13. An ignitible disinfectant adapted, upon ignition, to burn at a non-explosive rate with the resultant production of a copious quantity of sulfur dioxide gas, said disinfectant comprising a solid combustion-supporting oxidizer, a metal sulfate of the class consisting of the sulfates of copper, iron, calcium, and magnesium, and sulfur, said sulfur being present in sufficient quantity so that a portion of the sulfur is stoichiometrically balanced with the oxidizer and will react therewith to produce sulfur dioxide and a predetermined quantity of heat, and the remainder of the sulfur is stoichiometrically balanced with the metal sulfate and will react therewith to produce sulfur dioxide and to absorb substantially all of the heat produced by the reaction between the sulfur and the oxidizer.

References Cited in the file of this patent

UNITED STATES PATENTS

| Number | Name | Date |
|---|---|---|
| 161,325 | Caiiuc | Mar. 30, 1875 |
| 202,680 | Trent | Apr. 23, 1878 |
| 735,660 | Feval | Aug. 4, 1903 |
| 811,074 | Minix | Jan. 30, 1906 |
| 849,925 | Silberrad | Apr. 9, 1907 |
| 1,207,766 | Katzenberger | Dec. 12, 1916 |
| 2,008,489 | Cousins | July 16, 1935 |
| 2,124,494 | Memminger | July 19, 1938 |
| 2,436,309 | Koebel | Feb. 17, 1948 |
| 2,557,814 | Dinsdale et al. | June 19, 1951 |
| 2,606,095 | Bateman et al. | Aug. 5, 1952 |
| 2,606,858 | Gillies | Aug. 12, 1952 |
| 2,628,897 | Vinton | Feb. 17, 1953 |